(12) United States Patent
Iudica

(10) Patent No.: US 12,215,007 B2
(45) Date of Patent: *Feb. 4, 2025

(54) MOTORCYCLE LOADER

(71) Applicant: Frank Iudica, Santa Clarita, CA (US)

(72) Inventor: Frank Iudica, Santa Clarita, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/429,746

(22) Filed: Feb. 1, 2024

(65) Prior Publication Data

US 2024/0166482 A1 May 23, 2024

Related U.S. Application Data

(63) Continuation of application No. 17/917,768, filed as application No. PCT/US2021/043231 on Jul. 26, 2021, now Pat. No. 11,912,548.

(60) Provisional application No. 63/059,645, filed on Jul. 31, 2020.

(51) Int. Cl.
 *B66F 7/24* (2006.01)
(52) U.S. Cl.
 CPC .................. *B66F 7/243* (2013.01)
(58) Field of Classification Search
 CPC ........ B66F 7/243; B62M 13/00; B62M 13/04; B62M 23/02
 See application file for complete search history.

(56) References Cited

U.S. PATENT DOCUMENTS

| | | | | | |
|---|---|---|---|---|---|
| 4,974,695 | A | * | 12/1990 | Politte | B62M 23/02 180/221 |
| 5,069,304 | A | * | 12/1991 | Mann | B62M 7/00 180/221 |
| 6,065,557 | A | * | 5/2000 | von Keyserling | B62M 13/00 180/907 |
| 7,665,744 | B1 | * | 2/2010 | Phillips | B62M 23/00 280/79.11 |
| 2002/0051703 | A1 | * | 5/2002 | Clary | B60P 3/122 414/538 |
| 2019/0176932 | A1 | * | 6/2019 | Chi-Hsueh | B62J 50/21 |
| 2019/0291815 | A1 | | 9/2019 | Viglione et al. | |
| 2020/0231248 | A1 | * | 7/2020 | Bengtsson | B62M 6/75 |
| 2020/0307738 | A1 | * | 10/2020 | Ray | B62K 19/40 |

OTHER PUBLICATIONS

ISR and Written Opinion of PCT/US2021/043231, filed Jul. 26, 2021; Date of Mailing Nov. 3, 2021.

* cited by examiner

*Primary Examiner* — Kaitlin S Joerger
(74) *Attorney, Agent, or Firm* — Scheef & Stone, LLP; Mark D. Nielsen

(57) ABSTRACT

A motorcycle loader 100 for moving a motorcycle 10 without turning the motorcycle 10 on, and in particular, moving the motorcycle 10 to an elevated surface by attaching a friction wheel 102 to one of the tires 16 of the motorcycle 10 using a frame 110 that attaches to the motorcycle 10, and uses a motor 103 operatively connected to the friction wheel 102 to power the friction wheel 102, which causes the motorcycle wheel 16 to turn, thereby mobilizing the motorcycle 10. A controller 104 connected to the motor 103 of the motorcycle loader 100 can control the power, direction, and speed of the motor 103. The controller 104 can be connected to the battery of the motorcycle 10 to power the friction wheel 102. A clamp 160 operatively connected to the friction wheel 102 can be used to engage or disengage the friction wheel 102 from the tire 16 of the motorcycle 10.

17 Claims, 4 Drawing Sheets

MOTORCYCLE LOADER

CROSS-REFERENCE TO RELATED APPLICATION

This application is a continuation of U.S. patent application Ser. No. 17/917,768 filed on Oct. 7, 2022, titled "MOTORCYCLE LOADER," which is a national phase application under 35 U.S.C § 371 of International Patent Application No. PCT/US2021/043231 filed on Jul. 26, 2021, which claims the benefit of U.S. Provisional Patent Application Ser. No. 63/059,645 filed Jul. 31, 2020, titled "MOTORCYCLE LOADER," all of which in their entireties are hereby incorporated by reference herein for all purposes.

TECHNICAL FIELD

This invention relates to devices and methods for loading motorcycles onto a transport vehicle or other elevated location.

BACKGROUND

Motorcyclists find it challenging and stressful to load their motorcycles onto to a transport vehicle, such as a truck, van trailer, and the like, without causing damage to the motorcycle or causing injury to themselves, especially after a hard day of riding. Generally, due to the weight of the motorcycle, multiple people are required to push the motorcycle up a ramp. Most motorcyclists, however, would rather not have assistance from others because others may either push too much or not enough, which could create danger to any one of those pushing on the motorcycle. In addition, others do not care as much for the motorcycle as the owner, and therefore, others may not be paying as close attention to what they are pushing on. If they push on a fragile component on the motorcycle, the motorcycle can be damaged. At times, there may not be anybody else around to help. In some instances, as in the pandemic of 2020-2021, social distancing rules may prevent others from helping.

Alternative methods of loading a motorcycle onto a transport vehicle, such as backing the transport vehicle to a slope that would reduce the ramp angle, elaborate rigs with ATV winches, and elaborate winch systems that use a trolley with a very heavy ramp, or riding the motorcycle up the ramp are dangerous or end up being more work and requiring planning.

For the foregoing reasons there is a need for an easy to use device that can quickly, efficiently, and safely load a motorcycle onto a transport vehicle or some other elevated surface without requiring elaborate winch systems, lifts, or pre-planning.

DISCLOSURE OF INVENTION

The present invention is directed to a motorcycle loader to facilitate the safe, efficient, and easy loading of a motorcycle onto an elevated surface, such as a transport vehicle, trailer, elevated ground, and the like, by a single person using the components of the motorcycle and the leverage of the rear wheel. The motorcycle loader of the present invention can be used with existing loading accessories, such as standard ramps. This motorcycle loader is designed to provide the additional push needed to get the motorcycle up the ramp.

MODES FOR CARRYING OUT THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

Directional terms, such as above, below, front, back, and the like are used to describe position of components of the invention when the invention is properly installed on a motorcycle, with the front direction being towards the front wheel of the motorcycle and the back direction being towards the back wheel of the motorcycle.

Figure 1:
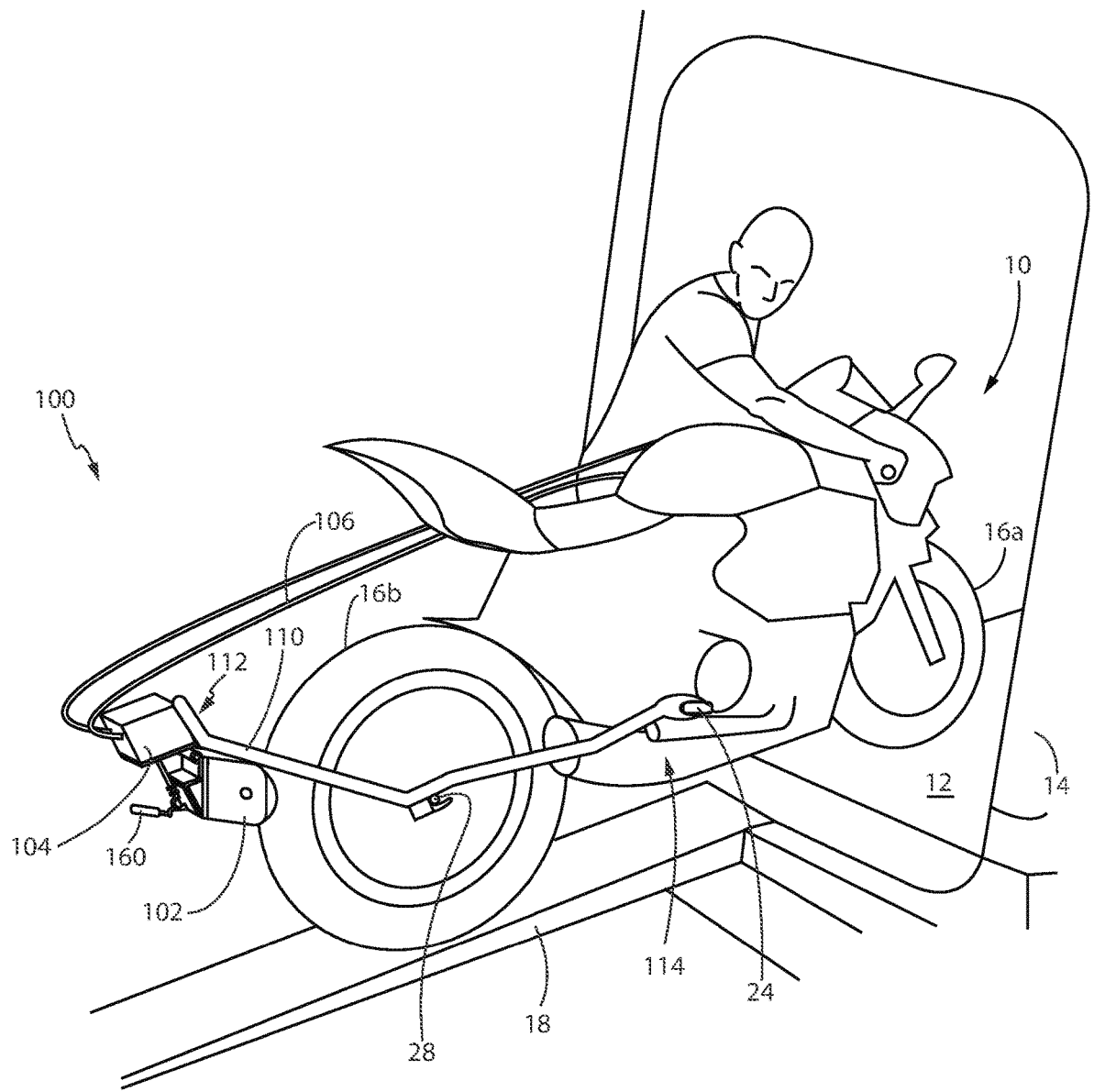
FIG. 1 shows an embodiment of the present invention being used to load a motorcycle onto a transport vehicle.
Figure 2:
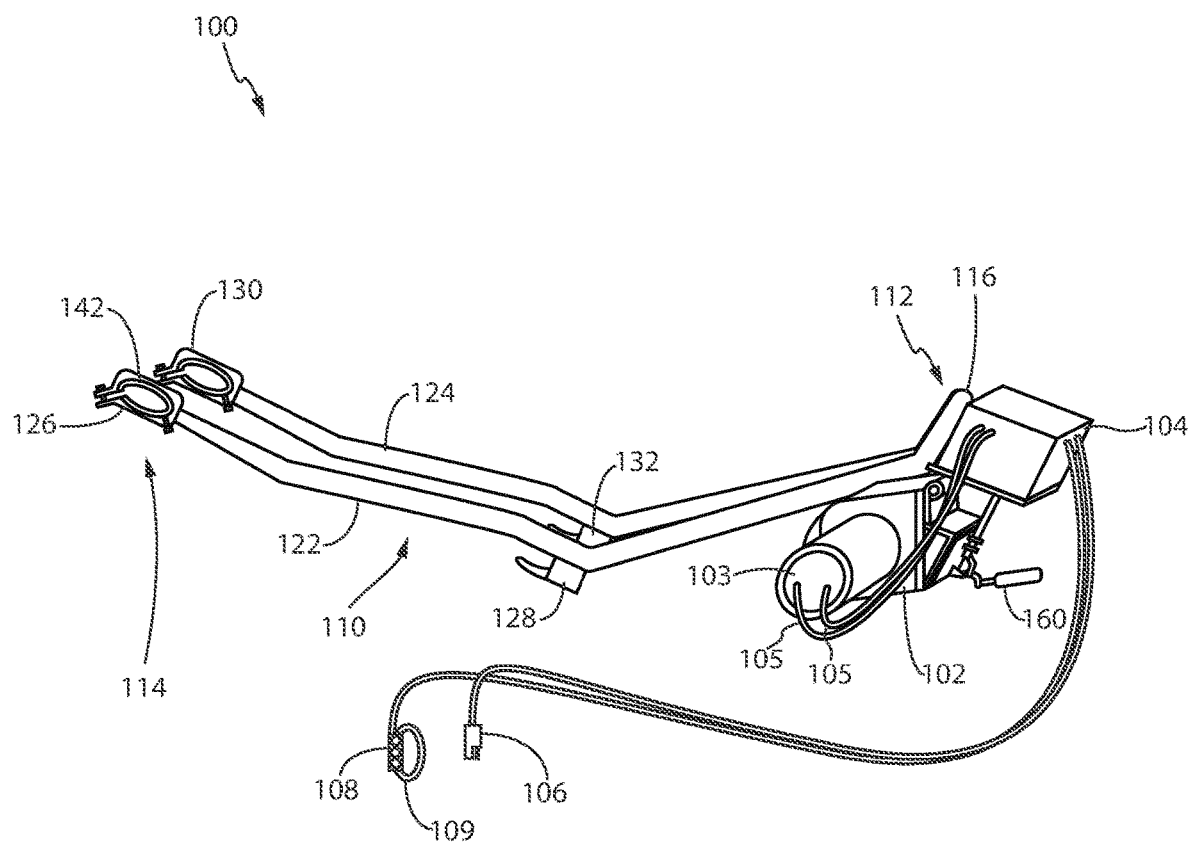
FIG. 2 shows a perspective view of an embodiment of the present invention.

With reference to FIGS. 1-2, the invention of the present application is a device for loading motorcycles 10 onto an elevated surface 12, such as a transport vehicle 14, utilizing a friction wheel 102 to drive one of the tires 16 of a motorcycle 10 to facilitate movement of the motorcycle 10 while the user guides the motorcycle 10 up a ramp 18 onto the elevated surface. A friction wheel 102 can be any type of circular, cylindrical, spherical, or otherwise rotating device or mechanism, a conveyor system, and the like, in which the rotational movement of the friction wheel 102 is transferred to the motorcycle tire 16 using frictional forces. For example, the friction wheel 102 can be a rubberized wheel, a concave shaped wheel, a track, a belt (such as a conveyor belt), and the like. As such, the user does not have to exert significant energy pushing a motorcycle 10 weighing hundreds of pounds up a ramp 18, or even attempting to ride the motorcycle up the ramp 18, both of which would pose significant danger to the user and risk damage to the motorcycle.

Figure 3:
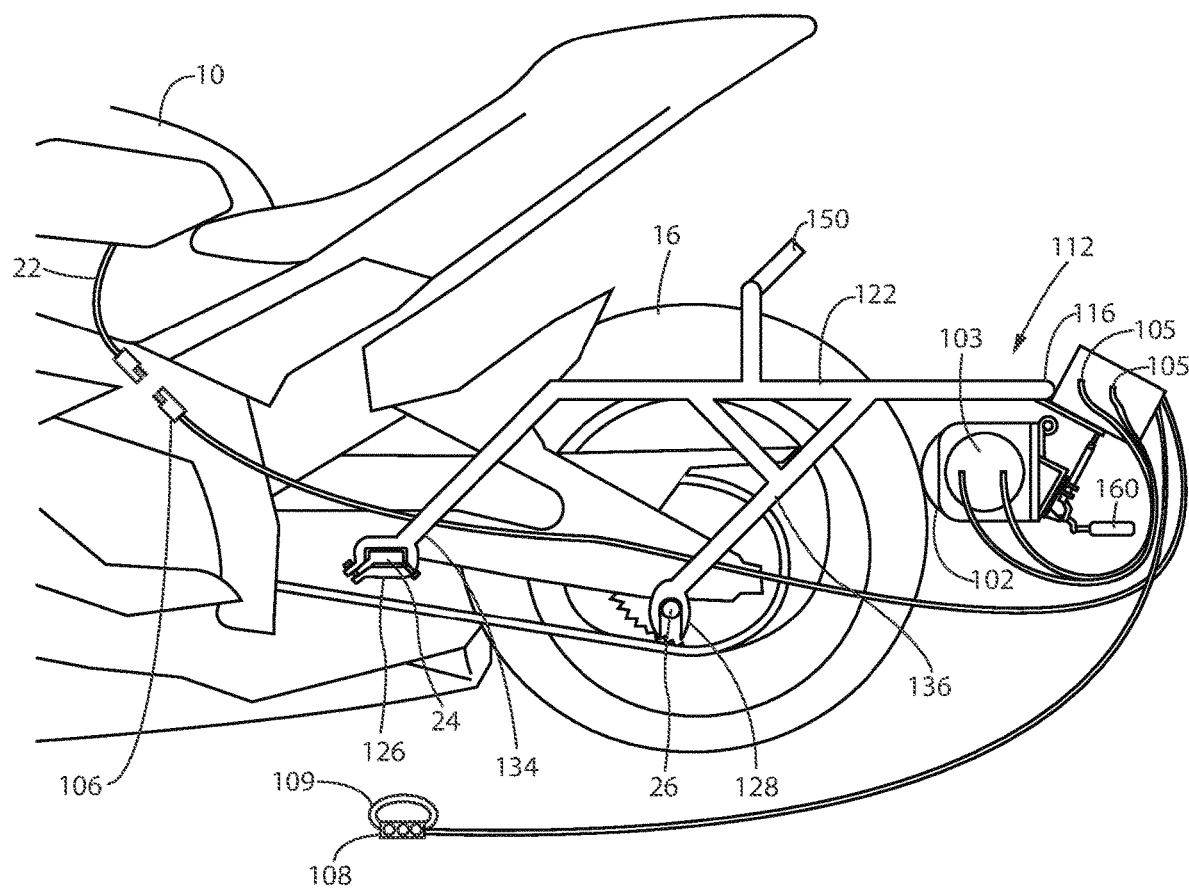
FIG. 3 shows a side view of an embodiment of the present invention installed on a motorcycle.

The motorcycle loader 100 can further comprise a motor 103 operatively connected to the friction wheel 102 to drive the friction wheel 102. The motor 103 can be an electric motor, such as a 12 volt variable speed electric motor. The motor 103 can have motor wires 105 extending therefrom to connect to a power source 20, such as a battery, directly or via a controller 104. In the preferred embodiment, the friction wheel motor 103 is connected to the controller 104, and the controller 104 can be connected to the power source 20 via controller wires 106. The power source 20 can be the battery of the motorcycle 10. As such, the motorcycle loader 100 does not need its own power source. By way of example only, the motorcycle 10 may be equipped with a battery tender lead 22, such as a 2-pin SAE connector cable attached to the battery of the motorcycle 10 as shown in FIG. 3. The controller wires 106 can be configured to connect with the battery tender lead 22.

Figure 4:
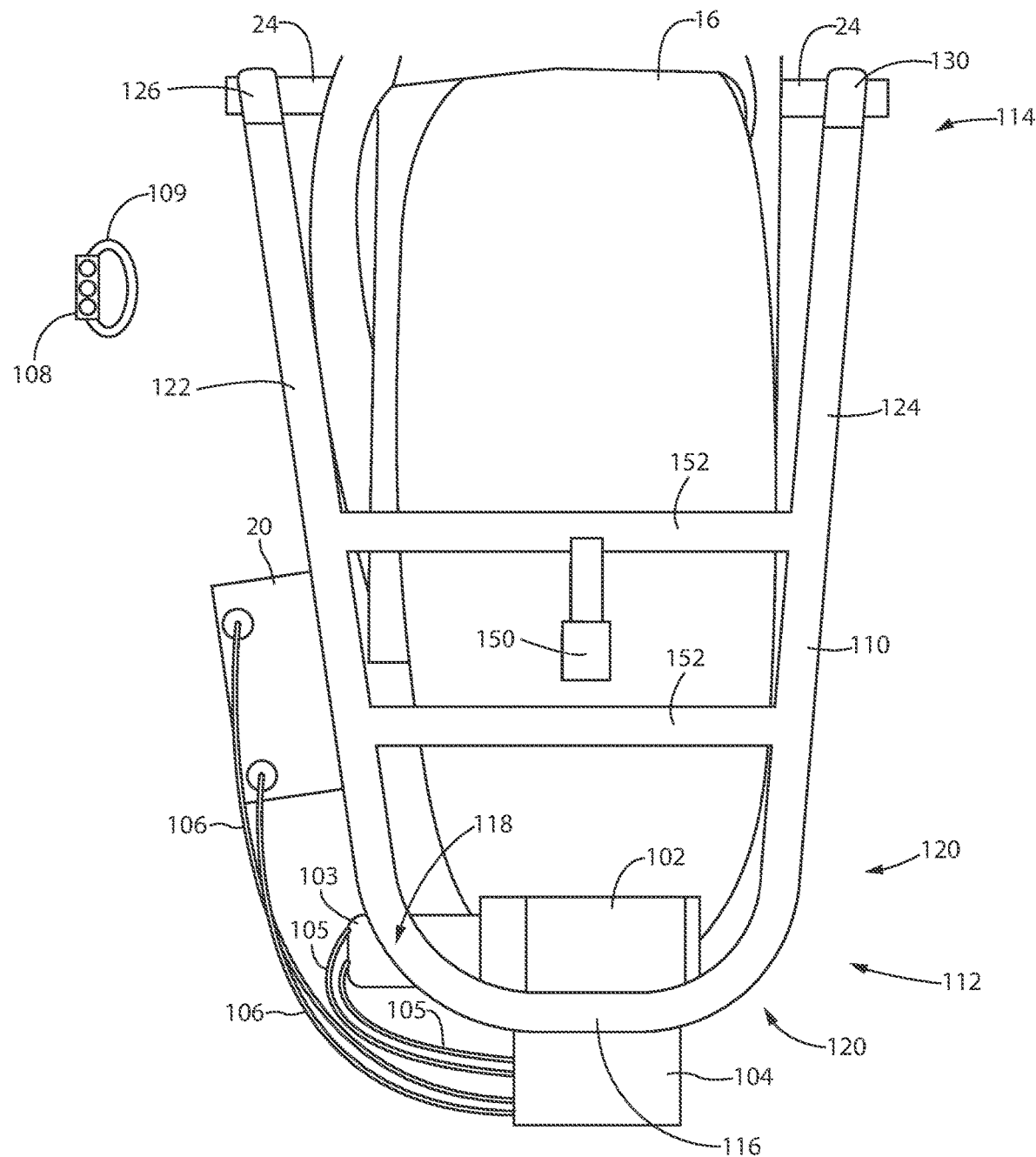
FIG. 4 shows a top plan view of an embodiment of the present invention installed on a motorcycle.

In some embodiments, the power source 20 can be a separate battery that can be mounted on the motorcycle loader 100 as shown in FIG. 4. In some embodiments, the controller wires 106 can be configured to connect to an AC outlet.

The motorcycle loader 100 can further comprise a switch 108 operatively connect to the friction wheel motor 103. The switch 108 can comprise one or more actuators to turn the friction wheel motor 103 on, turn the friction wheel motor 103 off, change or set the direction of rotation of the friction wheel 102 (e.g., run the friction wheel 102 in the forward direction or the reverse direction), and/or change the speed of rotation the friction wheel 102. As such, the switch 108 can control the direction of movement of the motorcycle 10 as well as the speed of movement of the motorcycle 10. The switch 108 can be connected to the friction wheel motor 103 via the controller 104 via wires or the switch 108 can be wirelessly connected to the controller 104. In the preferred embodiment, the switch 108 can be a momentary switch; however, other types of switches 108 are suitable, such as toggles, sliders, push-buttons, and the like. The switch 108 can be connected to a holder 109. The holder 109 can be used to hold the switch in the user's hand or to mount the switch 108 onto the motorcycle 10. For example, the holder 109 can be a clip, a band, a strap, a ring, a hook, and the like. Preferably, the holder 109 mounts the switch 108 to the handles of the motorcycle 10. Mounting the switch 108 on the handles of the motorcycle 10 allows the user to guide the motorcycle 10 while actuating the friction wheel 102.

The motorcycle loader 100 can further comprise a frame 110 to connect the friction wheel 102 to the motorcycle 10. As such, the friction wheel 102 can be mounted on the frame 110, and the frame 110 mounted on the motorcycle 10. The friction wheel 102 can be mounted on the front tire 16a or the rear tire 16b of the motorcycle 10. In the preferred embodiment, the friction wheel 102 is mounted on the rear tire 16b of the motorcycle 10.

The frame 110 is configured to press the friction wheel 102 against the tire 16 of the motorcycle 10 with sufficient force that the friction between the friction wheel 102 and the motorcycle tire 16 is sufficiently high enough that rotation of the friction wheel 102 causes rotation of the motorcycle tire 16 when the motorcycle 10 is off or in neutral.

As best seen in FIGS. 2 and 4, in the preferred embodiment, the frame 110 is a U-shaped bar having a proximal end 112 and a distal end 114 opposite the proximal end 112. The U-shaped bar comprises a base bar 116 at the proximal end, the base bar 116 defining a first end 118 and a second end 120 opposite the first end 118. A first arm 122 can extend from the first end 118 towards the distal end 114. A second arm 124 can extend from the second end 120 towards the distal end 114. The friction wheel 102 can be mounted to the frame 110 at the proximal end 112. With this arrangement, the frame 110 can be mounted on sturdy components of the motorcycle 10 with the friction wheel 102 mounted on the tire 16 of the motorcycle 10 with sufficient pressure between the friction wheel 102 and the tire 16 of the motorcycle 10 such that rotation of the friction wheel 102 causes rotation of the tire 16 of the motorcycle 10.

Although the friction wheel 102 can make contact with any exposed portion of the tire 16 of the motorcycle 10, in the preferred embodiment, the friction wheel 102 is mounted on the upper half of the tire 16 of the motorcycle 10 to facilitate installation of the motorcycle loader 100 on the motorcycle 10.

To hold the friction wheel 102 in place on the motorcycle tire 16, the frame 110 preferably has four mounting points to connect to the motorcycle 10. Although four mounts are preferred, the frame 110 can have two mounts, three mounts, or more than four mounts. The mounts are strategically placed to hold the friction wheel 102 in a fixed position relative to the motorcycle tire 16 so that when the friction wheel 102 is activated, the friction wheel 102 does not travel along the motorcycle tire 16, but rather, maintains a fixed translational position, thereby causing rotation of the motorcycle tire 16 to which the friction wheel 102 is mounted.

In the preferred embodiment, the first arm 122 comprises a first front mount 126, and a first back mount 128 in between the first front mount 126 and the proximal end 112. The second arm 124 comprises a second front mount 130, and a second back mount 132 in between the second front mount 130 and the proximal end 112. In the preferred embodiment, the first front mount 126 and the second front mount 130 can be configured to connect to the foot pegs 24 (also known as footrests) of the motorcycle 10. The first back mount 128 and the second back mount 132 are configured to connect to the motorcycle adjacent to the rear tire 16b of the motorcycle 10. For example, many motorcycles 10 are equipped with swingarms that are configured to receive and hold spools 26 (also known as swingarm spools when associated with swingarms). As such, the first back mount 128 and the second back mount 132 can be configured to mount to the rear spools 26 located adjacent to the rear tire 16b. In some embodiments, the spools 26 can be connected to other sturdy components of the motorcycle 10. Alternatively, the first back mount 128 and the second back mount 132 can be configured to connect to the wheel axle 28 (i.e. the nut or bolt fastening the axle to the wheel, or any accessory attached thereto).

To mount the friction wheel 102 on the upper half of the motorcycle tire, the proximal end 112 of the frame 110 can be positioned above at least the first and second back mounts 128, 132 when the motorcycle loader 100 is properly installed on the motorcycle. Preferably, the friction wheel 102 is positioned above the first and second front mounts 126, 130 as well when properly installed on the motorcycle 10. For example, the first and second arms 122, 124 can bend upwardly moving from the distal end 114 to the proximal end 112 as shown in FIGS. 1 and 2. With the friction wheel 102 mounted on the proximal end 112, the friction wheel 102 is above the mounts 126, 128, 130, 132.

In some embodiments, as shown in FIG. 3, the mounts 126, 128, 130, 132 can be placed on extension bars 134, 136. For example, the first front mount 126 can be connected to the first arm 122 by a first front extension bar 134. The first back mount 128 can be connected to the first arm 122 by a first back extension bar 136. The second front mount 130 can be connected to the second arm 124 by a second front extension bar (not shown but essentially the same as extension bar 134). The second back mount 132 can be connected to the second arm 124 by a second back extension bar (not shown but essentially the same as extension bar 136). The extension bars 134, 136 can project downwardly from their respective arms 122, 124. As such, when mounted on the motorcycle, the extension bars 134, 136 essentially elevate the arms 122, 124 and the friction wheel 102 above the mounting point.

The mounts 126, 128, 130, 132 can be any configuration that restricts movement of the arms 122, 124 in one or more directions. By way of example only, the mounts 126, 128, 130, 132 can be at type of slot, such as a fork, a hook, a dropout, a ring, a clamp, and the like, that can slide onto a sturdy projection from the motorcycle 10. The mounts 126, 128, 130, 132 can also be a type of projection, such as pegs, studs, rivets, dowels, and the like, that can be inserted into a hole in one of the components of the motorcycle 10.

In the preferred embodiment, the first front mount 126 and the second front mount 130 can be a clamp configured to be secured on to the footrest 24 of the motorcycle 10. The clamp can have a liner 142 to protect the foot peg 24 from scratches, dents, dings, or other form of damage from the clamping action. For example the liner 142 can be fabric, rubber, plastic, cork, and the like. In the preferred embodiment, the liner 142 is UHMW plastic.

In some embodiments, as shown in FIGS. 3 and 4, to facilitate installation, the motorcycle loader 100 can have a handle 150 connected to the frame 110. Preferably, the handle 150 is connected to the frame 110 at the proximal end 112 as the proximal end 112 is where the friction wheel 102 is mounted and is therefore, the heaviest portion of the motorcycle loader 100. The handle 150 can be a crossbar 152 connecting the first arm 122 and the second arm 124. Alternatively, the handle 150 can be mounted on the crossbar 152.

To function properly, the friction wheel 102 must apply enough force on the motorcycle tire 16 such that rotation of the friction wheel 102 causes rotation of the motorcycle tire 16. In the preferred embodiment, to facilitate proper contact between the friction wheel 102 and the motorcycle tire 16, the motorcycle loader 100 can have a clamp 160 operatively connected to the friction wheel 102. The clamp 160 can be configured to cause the friction wheel 102 to engage the motorcycle tire 16 to cause the motorcycle tire 16 to move with the friction wheel 102, or disengage the motorcycle tire 24 such that activation of the friction wheel 102 does not cause any movement of the motorcycle tire 16. As such, the clamp 160 can have an engaged position and a disengaged position, wherein in the engaged position, the friction wheel 102 is moved in a forward position towards the distal end 114 of the frame 110, and in the disengaged position, the friction wheel 102 is moved in a rearward position towards the proximal end 112 of the frame 110. As such, when the frame 110 is mounted on the motorcycle 10, the friction wheel 102 can have no contact or loose contact with the tire 16 of the motorcycle. When the clamp 160 is engaged, then the friction wheel 102 can have a tight contact with the motorcycle tire 16 to cause the motorcycle tire 16 to rotate when the friction wheel 102 rotates. In the preferred embodiment, the clamp 160 is a toggle clamp; however, other types of clamps can be used such as screwing clamps, spring-loaded clamps, sliding clamps, and the like.

With these basic principles, many variations have also been contemplated and fall under the scope of this invention. For example, as motorcycles 10 come in a variety of shapes and sizes, the frame 110 can be tailored for specific motorcycles 10. Alternatively, the frame 110 can be made adjustable to accommodate the different shapes and sizes of motorcycles 10. For example, the first arm 122 and second arm 124 can be telescoping arms that can lock in place at various lengths. Similarly, the base bar 116 can be made telescoping that can lock in place at various widths. In some embodiments, the mounts 126, 128, 130, 132 can be made moveable along their respective arms 122, 124 and locked into place to fit foot pegs 24, spools 26, and axles 28 at different positions.

In some embodiments, the frame 110 can utilize three mounts. For example, the first arm 122 can be connected adjacent to the rear wheel 16*b* of the motorcycle 10 on one side, and the second arm 124 can be connected adjacent to the rear wheel 16*b* of the motorcycle 10 on the opposite side. A third arm can project from the proximal end 112 of the frame 110 towards the distal end 114 in between the first arm 122 and the second arm 124, such that the third arm can connect to the seat or other centrally located, sturdy component of the motorcycle 10.

In some instances, the top half of the motorcycle tire 16 can be covered by a fender making it inconvenient to mount the friction wheel 102 on the upper half of the motorcycle tire 16. As such, the frame 110 of the motorcycle loader 100 can be configured to mount the friction wheel 102 on the lower half of the motorcycle tire 16. In some embodiments, the proximal end 112 of the frame 110 can be made adjustable so that the friction wheel 102 can be raised or lowered as necessary. For example, the proximal end 112 may be connected to the first arm 122 and second arm 124 by a joint.

The preferred embodiment of the motorcycle loader 100 can be used by connecting the first back mount 128 to the motorcycle 10 adjacent to a rear wheel 16*b* of the motorcycle 10 on a first side, connecting the second back mount 132 to the motorcycle 10 adjacent to the rear wheel 16*b* of the motorcycle 10 on a second side, connecting the first front mount 126 to the motorcycle 10 on the first side, connecting the second front mount 130 to the motorcycle 10 on the second side, clamping the friction wheel 102 against the rear tire 16*b* of the motorcycle 10 using a first clamp 160, connecting the controller wire 106 to a power source 20, actuating the motor 103 of the motorcycle loader 100 with the switch 108 to drive the friction wheel 102 to drive the rear wheel 16*b* of the motorcycle 10, and guiding the motorcycle 10 up a ramp 18 connected to the elevated surface 12, whereby the motorcycle 10 is loaded onto the elevated surface 12. Prior to actuating the switch 108, the user can set the desired direction and speed of the friction wheel.

Preferably, the controller wire 106 is connected to the battery of the motorcycle 10 as the power source 20. This eliminates the need to carry an external battery power source 20. In some embodiments, however, an external power source 20, such as a battery, can be mounted on the frame 110 to power the motorcycle loader 10.

Preferably, first front mount 126 is connected to a first foot peg 24 on the first side of the motorcycle 10; and the second front mount 130 is connected to a second foot peg 24 on the second side of the motorcycle 10.

Preferably, the first back mount 128 is connected to a first rear spool 26 on the first side of the motorcycle 10, and the second back mount 132 is connected to a second rear spool 26 on the second side of the motorcycle 10.

In further embodiments, the first arm 122 and second arm 124, the mounts 126, 128, 130, 132, and/or the proximal end 112 of the frame 110 can be adjusted to properly fit the motorcycle.

The installation steps are not limiting, as any of a variety of steps described above can be performed in any sequence. Due to the weight being on the proximal end 112 of the frame 110, it is likely easiest to mount the back mounts 128, 132 first.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto. As such, figures showing specific embodiments does not mean the invention is limited to the exact embodiment shown. Figures show examples of how different features of the invention can be combined, but the features can be combined in other ways that may not necessarily be shown in the figures.

INDUSTRIAL APPLICABILITY

This invention may be industrially applied to the development, manufacture, and use of a motorcycle loader 100 that attaches to a motorcycle 10 and uses a friction wheel 102 to drive the motorcycle wheel 16 to facilitate movement of the motorcycle 10, particularly, up a ramp 18 to an elevated surface 12. The motorcycle loader 100 attaches to the motorcycle 10 with a frame 110 that connects to sturdy components of the motorcycle 10, such as the foot peg 24, spool 26, or axle 28. The motorcycle loader 100 has a motor 103 operatively connected to the friction wheel 102, and a controller 104 operatively connected to the motor 103, wherein the controller 104 is configured to connect to the battery of the motorcycle 10 to power the motor 103 of the motorcycle loader 100.

What is claimed is:

1. A device for loading a motorcycle onto an elevated surface, comprising:
    a frame comprising a base bar, a first arm extending from the base bar, and a second arm extending from the base bar, wherein the first arm comprises a first front mount at a distal end of the first arm, and wherein the second arm comprises a second front mount at a distal end of the second arm, and wherein the first front mount of the first arm is configured to connect to a first foot peg of the motorcycle, and wherein the second front mount of the second arm is configured to connect to a second foot peg of the motorcycle;
    a friction wheel mounted to the base bar;
    a motor operatively connected to the friction wheel and configured to drive the friction wheel in at least one direction; and
    a controller operatively connected to the motor.

2. The device of claim 1, wherein the frame is mounted to the motorcycle and maintains a fixed translational position with respect to the motorcycle.

3. The device of claim 1, wherein the first arm is disposed on a first side of the motorcycle, and wherein the second arm is disposed on a second opposing side of the motorcycle.

4. The device of claim 1, wherein the first arm comprises a first rear mount located between the base bar and the distal end of the first arm, and wherein the second arm comprises a second rear mount located between the base bar and the distal end of the second arm.

5. The device of claim 4, wherein the first rear mount of the first arm and the second rear mount of the second arm are configured to connect to the motorcycle adjacent to a rear wheel of the motorcycle.

6. The device of claim 5, the first rear mount of the first arm and the second rear mount of the second arm are configured to connect to rear spools of the motorcycle.

7. The device of claim 5, wherein the first rear mount of the first arm and the second rear mount of the second arm are configured to connect to a rear wheel axle, bolts fastening the rear wheel axle to the rear wheel of the motorcycle, or a combination thereof.

8. The device of claim 1, wherein the friction wheel is positioned above front mounts of the first arm and the second arm, rear mounts the first arm and the second arm, or a combination thereof when the device is installed on the motorcycle.

9. The device of claim 1, where the frame comprises a unitary U-shaped bar.

10. A device for loading a motorcycle onto an elevated surface, comprising:
    a frame comprising a base bar, a first arm extending from the base bar, and a second arm extending from the base bar;
    a friction wheel mounted to the base bar;
    a motor operatively connected to the friction wheel and configured to drive the friction wheel in at least one direction; and
    a controller operatively connected to the motor;
    wherein each of the first arm and the second arm are adjustable in length.

11. The device of claim 1, further comprising: a switch operatively connected to the controller, wherein the switch is configured to adjust a speed, a direction, or both of the friction wheel.

12. The device of claim 1, wherein the motor and the controller are operatively connected to a battery.

13. A device for loading a motorcycle onto an elevated surface, comprising:
    a frame comprising a proximal end and a distal end, wherein the frame comprises a base bar at the proximal end, a first arm extending from the base bar towards the distal end along a first side of the motorcycle, and a second arm extending from the base bar towards the distal end along a second opposing side of the motorcycle;
    a friction wheel mounted to the frame;
    a motor operatively connected to the friction wheel and configured to drive the friction wheel in at least one direction; and
    a controller operatively connected to the motor and configured to control operation of the friction wheel;
    wherein the first arm comprises a first front mount coupled to first foot peg of the motorcycle, and wherein the second arm comprises a second front mount coupled to a second foot peg of the motorcycle.

14. The device of claim 13, wherein the first arm comprises a first rear mount located between the base bar and the first front mount of the first arm, and wherein the second arm comprises a second rear mount located between the base bar and the second front mount of the second arm.

15. The device of claim 14, wherein the first rear mount is coupled to a first rear spool of the motorcycle, a rear axle of the motorcycle, bolts fastening a rear wheel axle to a rear wheel of the motorcycle, or a combination thereof, and wherein the second rear mount is coupled to a second rear spool of the motorcycle, the rear axle of the motorcycle, the bolts fastening the rear wheel axle to the rear wheel of the motorcycle, or a combination thereof.

16. The device of claim 13, wherein each of the first arm and the second arm are adjustable in length.

17. The device of claim 13, wherein the friction wheel is selectively adjustable to engage a rear tire of the motorcycle to cause the motorcycle to move with rotation of the friction wheel.

* * * * *